(12) United States Patent
Stevenson et al.

(10) Patent No.: US 6,224,791 B1
(45) Date of Patent: May 1, 2001

(54) LACTONE/PHOSPHITE BLENDS

(75) Inventors: Don R. Stevenson, Dover; Daryl L. Stein, North Canton, both of OH (US)

(73) Assignee: Dover Chemical Corporation, Dover, OH (US)

( * ) Notice: Subject to any disclaimer, the term of this patent is extended or adjusted under 35 U.S.C. 154(b) by 0 days.

(21) Appl. No.: 09/482,759

(22) Filed: Jan. 13, 2000

Related U.S. Application Data

(63) Continuation of application No. PCT/US98/14477, filed on Jul. 13, 1998.
(60) Provisional application No. 60/052,391, filed on Jul. 14, 1997.

(51) Int. Cl.$^7$ .................................. F21V 9/04; C08K 5/15
(52) U.S. Cl. ............................................. 252/589; 524/111
(58) Field of Search ............................. 524/111; 252/589

(56) References Cited

U.S. PATENT DOCUMENTS

| | | |
|---|---|---|
| 4,325,863 | 4/1982 | Hinsken et al. . |
| 4,338,244 | 7/1982 | Hinsken et al. . |
| 5,175,312 | 12/1992 | Dubs et al. . |
| 5,364,895 | 11/1994 | Stevenson et al. . |
| 5,516,920 | 5/1996 | Nesvadba et al. . |
| 5,614,572 | 3/1997 | Nesvadba et al. . |
| 5,883,165 * | 3/1999 | Krohnke et al. ........................ 524/111 |

\* cited by examiner

*Primary Examiner*—Philip Tucker
(74) *Attorney, Agent, or Firm*—Oldham & Oldham Co., LPA

(57) ABSTRACT

This invention discloses synergistic blends of phosphates and lactones having a base structure of 3-phenylbenzofuran-2-one with or without other additives as stabilizers for polymers, particularly during melt processing as evidenced by changes in melt flow and in some instances, resistance to yellowing.

22 Claims, No Drawings

LACTONE/PHOSPHITE BLENDS

This application claims the benefit of U.S. Provisional Application Nos.: Application No. 60/052,391 filing date Jul. 14, 1997.

This application is a continuation of copending applications International Application PCT/US98/14477 filed on Jul. 13, 1998, and which designated the U.S.

TECHNICAL FIELD

This invention pertains generally to synergistic blends of phosphites and lactones having a base structure of 3-phenylbenzofuran-2-one with or without other additives as stabilizers for polymers.

BACKGROUND OF THE INVENTION

The invention described herein pertains generally to synergistic blends of certain phosphites and lactones having a base structure of 3-phenylbenzofuran-2-one or blends of phosphites, hindered phenol antioxidants, and lactones having a base structure of 3-phenylbenzofuran-2-one.

Various prior art references teach the incorporation of additives into organic polymeric materials. U.S. Pat. Nos. 4,325,863 and 4,325,863 disclose a process for stabilizing organic polymers by incorporating a benzofuran(2)one or indolin(2)one. U.S. Pat. No. 5,175,312 discloses novel compounds of 3-phenylbenzofuran-2-ones while U.S. Pat. No. 5,516,920 discloses novel compounds of 3-arylbenzofuranones and U.S. Pat. No. 5,607,624 discloses methods for their preparation.

The references however, do not disclose the use of synergistic blends of lactones and phosphites with other polymer stabilizers such as UV absorbers and light stabilizers, metal deactivators, peroxide scavengers, basic co-stabilizers, nucleating agents, fillers and reinforcing agents, aminoxy propanoate derivatives, plasticizers, lubricants, emulsifiers, pigments and dyes, optical brightners, flame-proofing agents, antistatic agents, blowing agents, cross-linking agents, antiblocking agents, slip agents, processing aids, and thiosynergists.

What is illustrated in this invention is that various blends of phosphites and 3-phenyl-3H-benzofuran-2-one lactones and/or blends of phosphites, hindered phenol antioxidants, and 3-phenyl-3H-benzofuran-2-one lactones are useful stabilizers for polymers such as polyolefins, polycarbonates, polyesters, etc.

SUMMARY OF THE INVENTION

In accordance with the present invention, there is provided a composition of lactones having a base structure of 3-phenyl-3H-benzofuran-2-one which coacts with various phosphites synergistically to retard the degredation of various polymers.

It is an object of this invention to provide synergistic compositions of lactones and phosphites.

It is another object of this invention to provide synergistic compositions of lactones and phosphites in combination with conventional antioxidants.

These and other objects of this invention will be evident when viewed in light of the drawings, detailed description, and appended claims.

DETAILED DESCRIPTION OF THE INVENTION

It has been discovered that blends of various lactones and phosphites provide better protection against polymer degradation during processing as evidenced by changes in melt flow and may provide better resistance to yellowing than do the current commercially available additive blends.

A non-limiting list of exemplary phosphites that may be used in this invention would include bis(2,4-dicumylphenyl) pentaerythritol diphosphite (DOVERPHOS S-9228), tris-(2, 4-di-t-butylphenyl)phosphite (DOVERPHOS S-480), distearyl pentaerythritol diphosphite (DOVERPHOS S-680), trisnonylphenyl phosphite (DOVERPHOS 4), phenyl diisodecyl phosphite (DOVERPHOS 7), diphenyl isodecyl phosphite (DOVERPHOS 8), triphenyl phosphite (DOVERPHOS 10), trilauryl phosphite (DOVERPHOS 53), alkyl ($C_{12}$–$C_{15}$)bisphenol A phosphite (DOVERPHOS 613), alkyl ($C_{10}$)bisphenol A phosphite (DOVERPHOS 675), bis-(2,4-di-t-butylphenyl)pentaerythritol diphosphite (ULTRANOX 626), 2-butyl-2-ethyl-1,3-propanediol 2,4,6-tri-t-butylphenol phosphite (ULTRANOX 641), bis-(2,6-di-t-butyl-4-methylphenyl)pentaerythritol diphosphite (PEP 36), tetrakis-(2,4-di-t-butylphenyl) 4,4'-diphenylenediphosphonite (P-EPQ), 2,2'-ethylidene bis-(4, 6-di-t-butylphenyl)fluorophosphonite (ETHANOX 398), bis-(2,4-di-t-butyl-6-methylphenyl)ethyl phosphite (IRGAFOS 38) and 2,2',2"-nitrilotriethanol tris[3,3',5,5'-tetra-tert-butyl-1,1'-biphenyl-2,2'-diyl)-phosphite (IRGAFOS 12).

Preferred phosphites are bis(2,4-dicumylphenyl) pentaerythritol diphosphite (DOVERPHOS S-9228) and tris-nonylphenyl phosphite (TNPP).

A non-limiting exemplary list of hindered phenolic antioxidants that may be used in this invention would include 2,6-di-t-butyl-4-methylphenol (BHT), 2,6-di-t-butyl-4-ethylphenol, tetrakis methylene (3,5-di-t-butyl-4-hydroxyhydrocinnamate)methane (DOVERNOX 10), octadecyl 3,5-di-t-butyl-4-hydroxyhydrocinnamate (DOVERNOX 76), tris(3,5-di-t-butyl-4-hydroxybenzyl)-1, 3,5-triazine-2,4,6(1H, 3H, 5H)-trione (DOVERNOX 3114), and α-tocopherol (Vitamin E).

Preferred hindered phenolic antioxidants are BHT, tetrakis methylene (3,5-di-t-butyl-4-hydroxyhydrocinnamate) methane, octadecyl 3,5-di-t-butyl-4-hydroxyhydrocinnamate, tris(3,5-di-t-butyl-4-hydroxybenzyl)-1,3,5-triazine-2,4,6(1H, 3H, 5H)-trione, and Vitamin E.

The lactones which have been found effective in this invention have the base structural relationship shown in 3-phenyl-3H-benzofuran-2-one of general formula (I)

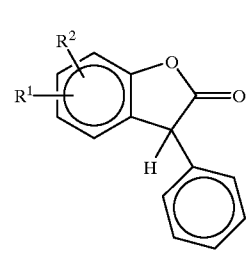

(I)

wherein:
R$^1$ and R$^2$ are independently selected from hydrogen, alkyl of 1–20 carbon atoms, aryl, aralkyl of 7–30 carbon atoms, and alkylaryl of 7–30 carbon atoms.

Specific examples of preferred lactones of structure 1 are: 5,7di-t-butyl-3-phenyl-3H-benzofuran-2-one; 5,7di-cumyl-3-phenyl-3H-benzofuran-2-one; nonyl-3-phenyl-3H-benzofuran-2-one; dinonyl-3-phenyl-3H-benzofuran-2-one;

5-t-butyl-3-phenyl-3H-benzofuran-2-one; 5-cumyl-3-phenyl-3H-benzofuran-2-one; and octyl-3-phenyl-3H-benzofuran-2-one.

These lactones may be prepared by methods known in the art such as by reaction of mandelic acid with the corresponding phenols: 2,4-di-t-butylphenol, 2,4-di-cumylphenol, nonylphenol, dinonylphenol, 4-t-butylphenol, 4-cumylphenol, and octylphenol.

For blends of phosphites and lactones, the lactone is added in a synergistic amount, and a weight ratio of phosphite: lactone may be any ratio between 100:1 to 0.01:1.0. A preferred range may be any ratio from 20:1 to 0.1:1. Additionally two or more phosphites and two or more lactones may be blended together in any ratio in order to make the lactone:phosphite blend.

Preferred phosphite/lactone blends are blends of bis-(2,4-dicumylphenyl)pentaerythritol diphosphite or tris-nonylphenyl phosphite with either 5,7-di-t-butyl-3-phenyl-3H-benzofuran-2-one or nonyl-3-phenyl-3H-benzofuran-2-one.

For blends of phosphites, hindered phenol antioxidants, and lactones, the lactone is added in a synergistic amount, and the weight ratio of phosphite:antioxidant:lactone may be any ratio between 100:100:1 to 0.01:0.01:1. A preferred range is from 20:20:1 to 0.1:0.1:1. Additionally, two of more two or more phosphites, and two or more hindered phenol antioxidants, and two or more lactones may be blended together in any ratio in order to make the phosphite/hindered phenol/lactone blend.

Preferred phosphite/hindered phenol antioxidant/lactone blends are blends of bis-(2,4-dicumylphenyl)pentaerythritol diphosphite with either tetrakis[methylene(3,5-di-t-butyl-4-hydroxyhydrocinnamate)]methane, octadecyl 3,5-di-t-butyl-4-hydroxyhydrocinnamate, tris(3,5-di-t-butyl-4-hydroxybenzyl)-1,3,5-triazine-2,4,6(1H, 3H, 5H)-trione, BHT, or Vitamin E with 5,7-di-t-butyl-3-phenyl-3H-benzofuran-2-one and blends of trisnonylphenyl phosphite (TNPP) with either tetrakis[methylene(3,5-di-t-butyl-4-hydroxyhydrocinnamate)]methane, octadecyl 3,5-di-t-butyl-4-hydroxyhydrocinnamate, tris(3,5-di-t-butyl-4-hydroxybenzyl)-1,3,5-triazine-2,4,6(1H, 3H, 5H)-trione, BHT, or Vitamin E with either nonyl-3-phenyl-3H-benzofuran-2-one or octyl-3-phenyl-3H-benzofuran-2-one A non-limiting exemplary list of the polymers in which the blends may be used would include polyolefins, PET, PBT, polystyrene, polyacrylics, polycarbonates, PVC, EPDM, SAN, PPO, SBR, ABS, and nylons. They may be used in any amount from 10 ppm to 10,000 ppm, and the blends may be compounded into the polymers by methods known in the art.

EXAMPLES

The best mode for carrying out the invention will now be described for the purposes of illustrating the best mode known to the applicant at the time. The examples are illustrative only and not meant to limit the invention, as measured by the scope and spirit of the claims.

Example 1

This example compares blends of bis-(2,4-dicumylphenyl)pentaerythritol diphosphite with various added antioxidants with and without a lactone.

To a mixture of bis-(2,4-dicumylphenyl)pentaerythritol diphosphite,

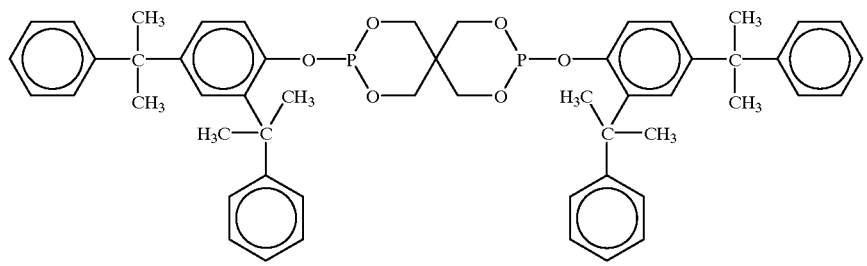

Bis-(2,4-dicumylphenyl)Pentaerythritol Diphosphite and various hindered phenol antioxidants (listed below as (A), (B) and (C)) were added the lactone, 5,7-di-t-butyl-3-phenylbenzofuran-2-one.

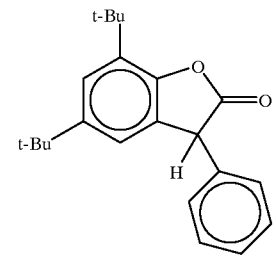

5,7-di-t-butyl-3-phenylbenzofuran-2-one

The ingredients were thoroughly mixed to form the desired blend.

The hindered phenols used were (A)tetrakis methylene (3,5-di-t-butyl-4-hydroxyhydrocinnamate)methane;

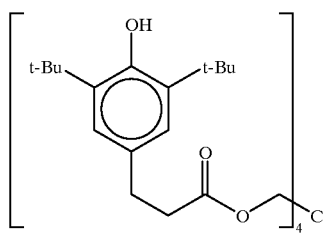

tetrakis methylene
(3,5-di-t-butyl-4-
hydroxyhydrocinnamate
methane (B) octadecyl 3,5-di-t-butyl-4-hydroxyhydrocinnamate; and

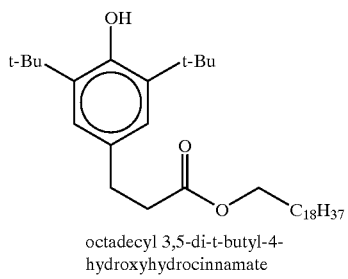

octadecyl 3,5-di-t-butyl-4-
hydroxyhydrocinnamate (C) tris(3,5-di-t-butyl-4-hydroxybenzyl)isocyanurate.

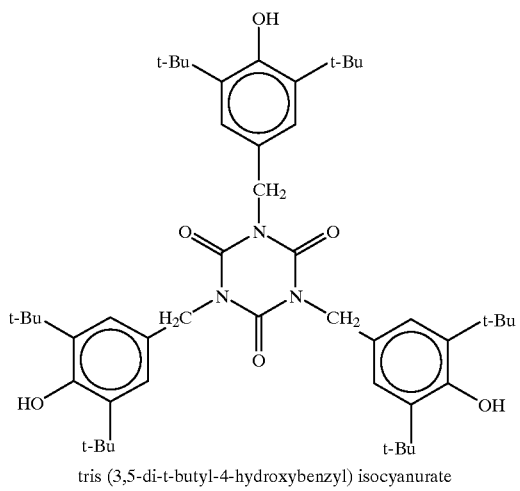

tris (3,5-di-t-butyl-4-hydroxybenzyl) isocyanurate

The following blends were prepared:
Blend #1,
  bis-(2,4-dicumylphenyl)pentaerythritol diphosphite (567 parts)
  tetrakis methylene (3,5-di-t-butyl-4-hydroxyhydrocinnamate)methane (283 parts)
  5,7di-t-butyl-3-phenylbenzofuran-2-one (150 parts)
Blend #2,
  bis-(2,4-dicumylphenyl)pentaerythritol diphosphite (567 parts)
  octadecyl 3,5-di-t-butyl-4-hydroxyhydrocinnamate (283 parts)
  5,7-di-t-butyl-3-phenylbenzofuran-2-one (150 parts)
Blend #3,
  bis-(2,4-dicumylphenyl)pentaerythritol diphosphite (567 parts)
  tris(3,5-di-t-butyl-4-hydroxybenzyl)isocyanurate (283 parts)
  5,7-di-t-butyl-3-phenylbenzofuran-2-one (150 parts)
In addition the following comparative blends were prepared:
Comparative Blend #1,
  bis-(2,4dicumylphenyl)pentaerythritol diphosphite (667 parts)
  tetrakis methylene (3,5-di-t-4-butyl-4-hydroxyhydrocinnamate)methane (333 parts)
Comparative Blend #2,
  bis-(2,4-dicumylphenyl)pentaerythritol diphosphite (667 parts)
  octadecyl 3,5-di-t-butyl-4-hydroxyhydrocinnamate (333 parts)

Comparative Blend #3,
  bis-(2,4-dicumylphenyl)pentaerythritol diphosphite (667 parts)
  tris(3,5-di-t-butyl-4-hydroxybenzyl)isocyanurate (333 parts)

These blends were then addded to Profax 6501 polypropylene at 1000 ppm along with 500 ppm of calcium stearate. The polypropylene was then subjected to multiple pass extrusion at 280° C. and 60 rpm using a Brabender PL 2000 single screw laboratory extruder. The melt flow (ASTM 1238) was measured after the first and fifth passes with a Tinius Olsen extrusion plastometer. The yellowness index was also measured after the first and fifth passes with a Hunter Lab model D25 calorimeter. The results are given in Table 1.

TABLE 1

| Blend | Melt Flow (g/10 min) | | Color (YI) | |
|---|---|---|---|---|
| | 1-Pass | 5-Pass | 1-Pass | 5-Pass |
| Blend #1 | 3.0 | 4.8 | 3.6 | 8.3 |
| Comp. Blend #1 | 4.1 | 8.8 | 3.6 | 11.4 |
| Blend #2 | 2.5 | 3.9 | 3.4 | 7.4 |
| Comp. Blend #2 | 4.6 | 5.8 | 4.2 | 8.0 |
| Blend #3 | 4.1 | 5.1 | 3.3 | 8.4 |
| Comp. Blend #3 | 5.9 | 6.0 | 4.2 | 9.0 |

As can be seen in Table 1, in every case blends containing the lactone (i.e., phosphite /antioxidant/lactone) have both a lower melt flow and a lower color than do comparative blends without the lactone (i.e., phosphite/antioxidant). A lower melt flow and lower color is indicative of less polymer degradation.

Example 2

This example is a comparison of trisnonylphenyl phosphite/lactone blends with trisnonylphenyl phosphite using various hindered phenol antioxidants. The following tris(nonylphenyl)phosphite (TNPP)

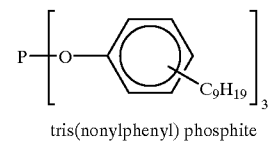

tris(nonylphenyl) phosphite blends were prepared with lactones, specifically with nonyl-3-phenyl-3H-benzofuran-2-one; and

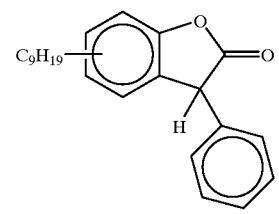

nonyl-3-phenyl-3H-
benzofuran-2-one 5,7-di-t-butyl 3-phenyl-3H-benzofuran-2-one

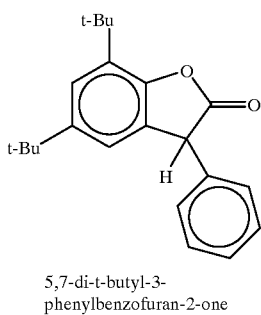

5,7-di-t-butyl-3-phenylbenzofuran-2-one

Blend #4, 85 wt % tris(nonylphenyl)phosphite and 15 wt % nonyl 3-phenyl-3H-benzofuran-2-one Blend #5, 85 wt % tris(nonylphenyl)phosphite and 15 wt % 5,7-di-t-butyl 3-phenyl-3H-benzofuran-2-one These blends were then added at 1000 ppm to Profax 6501 polypropylene along with 500 ppm of a hindered phenol antioxidant, namely tetrakis[methylene(3,5-di-t-butylhydroxyhydrocinnamate)]methane (DOVERNOX 10); octadecyl 3,5-di-t-butyl-4-hydroxyhydrocinnamate (DOVERNOX 76); and 1,3,5-tris(3,5-di-t-butyl-4-hydroxylbenzyl)-1,3,5-triazine-2,4,6(1H, 3H,5H)-trione (DOVERNOX 3114), and 500 ppm calcium stearate. The polymer was then subjected to multiple pass extrusion as described in Example 1. A comparison was made with multiple pass extrusions in which TNPP was substituted for the blend. The results are given in Table 2

TABLE 2

| Antioxidant/Blend | Melt Flow (g/10 min) | | Color (YI) | |
|---|---|---|---|---|
| | 1-Pass | 5-Pass | 1-Pass | 5-Pass |
| tetrakis[methylene(3,5-di-t-butylhydroxyhydro-cinnamate)] methane | | | | |
| Blend #4 | 2.8 | 3.4 | 3.6 | 9.9 |
| Blend #5 | 2.9 | 4.7 | 3.7 | 8.9 |
| TNPP | 4.1 | 6.9 | 4.6 | 8.5 |
| octadecyl 3,5-di-t-butyl-4-hydroxyhydrocinnamate | | | | |
| Blend #4 | 3.5 | 4.5 | 3.8 | 7.2 |
| Blend #5 | 3.3 | 4.8 | 3.6 | 6.3 |
| TNPP | 4.2 | 7.1 | 4.3 | 7.3 |
| 1,3,5-tris(3,5-di-t-butyl-4-hydroxylbenzyl)-1,3,5-triazine-2,4,6(1H,3H,5H)-trione | | | | |
| Blend #4 | 3.9 | 4.9 | 5.1 | 9.7 |
| Blend #5 | 3.9 | 4.5 | 4.1 | 10.8 |
| TNPP | 4.0 | 6.2 | 4.8 | 7.9 |

As can be seen in Table 2, the TNPP/lactone blends gave better melt flow stability than did TNPP without the lactone. Change in melt flow for polypropylene indicates polymer degradation.

Example 3

This example compares phosphite/lactone blends with and without Vitamin E. The following blends were prepared:

Blend #6

85 wt % tris(nonylphenyl)phosphite and 15 wt % nonyl-3-phenyl-3H-benzofuran-2-one Blend #7

75 wt % tris(nonylphenyl)phosphite and 15 wt % nonyl-3-phenyl-3H-benzofuran-2-one and 10 wt % Vitamin E These blends at 1000 ppm were thoroughly mixed into Profax 6501 polypropylene along with 500 ppm calcium stearate. The polypropylene was then subjected to multiple pass extrusion at 280° C. at 60 rpm using a Brabender PL 2000 laboratory extruder. The results are given in Table 3. The results show that a blend (Blend #6) of TNPP and a lactone give better melt flow and color stability than does TNPP alone and that a blend (Blend #7) of TNPP, lactone, and Vitamin E gives even better melt flow and color stability.

TABLE 3

| | Melt Flow (g/10 min) | | Color (YI) | |
|---|---|---|---|---|
| Material (ppm) | 1-pass | 5-pass | 1-pass | 5-pass |
| TNPP (control) | 5.5 | 11.0 | 5.0 | 10.8 |
| Blend #6 | 4.1 | 5.2 | 3.3 | 9.3 |
| Blend #7 | 3.8 | 4.0 | 3.6 | 9.0 |

Example 4

This example compares blends of this invention with a commercially available blend. The following blends were prepared:

Blend #8

56.7 wt % of bis(2,4-dicumylphenyl)pentaerythritol diphosphite and 28.3 wt % tetrakis[methylene(3,5-di-t-butyl-4-hydroxyhydrocinnamate)]methane and 15 wt % 2,4-di-t-4-butyl-3-phenyl-3H-benzofuran-2-one and Blend #9

56.7 wt % tris(2,4-di-t-butylphenyl)phosphite and 28.3 wt % tetrakis[methylene(3,5di-t-butyl-4-hydroxyhydrocinnamate)]methane and 15 wt % 2,4-di-t-butyl-3-phenyl-3H-benzofuran-2-one.

These blends were compared with the commercially available HP 2215, Comparative Blend #10 (made by Ciba Specialty Chemicals) which consists of Comparative Blend #10

56.7 wt % tris(2,4-t-butylphenyl)phosphite and 28.3 wt % tetrakis[methylene(3,5-di-t-butyl-4-hydroxyhydrocinnamate)]methane and 15 wt % 5,7-di-t-butyl-3-(3,4-di-methylphenyl)-3H-benzofuran-2-one.

The blends were mixed at 1000 ppm into Profax 6501 polypropylene along with 500 ppm of calcium stearate. The polypropylene was then subjected to multiple pass extrusion at 280° C. at 60 rpm using a Brabender PL 2000 laboratory extruder. The results a given in Table 4, and they show that Blend #8 has better melt flow and color stability and five pass than does the control while Blend #9 has better melt flow stability.

TABLE 4

| | Melt Flow (g/10 min) | | Color (YI) | |
|---|---|---|---|---|
| Blend | 1-Pass | 5-Pass | 1-Pass | 5-Pass |
| Blend #10 (HP 2215 control) | 4.2 | 5.7 | 3.5 | 5.5 |
| Blend #8 | 4.6 | 4.2 | 3.4 | 5.1 |
| Blend #9 | 4.4 | 5.1 | 3.7 | 5.9 |

Discussion

While the present invention has been directed to just a few stabilized polymer compositions which are primarily polyolefins, there is no need to limit it to such. In fact, any of the polymers known in the art, such as polyesters, polyurethanes, polyalkylene terephthalates, polysulfones, polyimides, polyphenylene ethers, styrenic polymers, polycarbonates, acrylic polymers, polyamides, polyacetals, halide containing polymers and polyolefin homopolymers and copolymers. Additionally included would be mixtures of different polymers, such as polyphenylene ether/styrenic resin blends, polyvinylchloride/ABS or other impact modified polymers, such as methacrylonitrile containing ABS, and polyester/ABS or polyester plus some other impact modifier may also be used. Such polymers are available commercially or may be made by means well known in the art. However, the diphosphosphites of the invention are particularly useful in thermoplastic polymers, such as polyolefins, polycarbonates, polyesters, polyphenylene ethers and styrenic polymers, due to the extreme temperatures at which the thermoplastic polymers are often processed and/or used.

Polymers of monoolefins and diolefins, for example would include polypropylene, polyisobutylene, polybutene-1, polymethylpentene-1, polyisoprene or polybutadiene, as well as polymers of cycloolefins; for instance of cyclopentene or norbornene, polyethylene (which optionally can be crosslinked), for example high density polyethylene (HDPE), low density polyethylene (LDPE) and linear low density polyethylene (LLDPE) may be used. Mixtures of these polymers, for example mixtures of polypropylene with polyisobutylene, polypropylene with polyethylene (for example PP/HDPE), may also be used. Also useful are copolymers of monoolefins and diolefins with each other or with other vinyl monomers, such as, for example, ethylene/propylene, LLDPE and its mixtures with LDPE, propylene/butene-1, ethylene/hexene, ethylene/ethylpentene, ethylene/heptene, ethylene/octene, propylene/butadiene, isobutylene/isoprene, ethylene/alkyl acrylates, ethylene/alkyl methacrylates, ethylene/vinyl acetate (EVA) or ethylene/acrylic acid copolymers (EM) and their salts (ionomers) and terpolymers of ethylene with propylene and a diene, such as hexadiene, dicyclopentadiene or ethylidene-norbornene; as well as mixtures of such copolymers and their mixtures with polymers mentioned above, for example polypropylene/ethylene-propylene copolymers, LDPE/EVA, LDPE/EAA, LLDPE/EVA and LLDPE/EM.

Thermoplastic polymers may also include styrenic polymers, such as polystyrene, poly-(p-methylstyrene), poly-(α-methylstyrene), copolymers of styrene or α-methylstyrene with dienes or acrylic derivatives, such as, for example, styrene/butadiene, styrene/acrylonitrile, styrene/alkyl methacrylate, styrene/maleic anhydride, styrene/budadiene/ethyl acrylate, styrene/acrylonitrile/methacrylate; mixtures of high impact strength from styrene copolymers and another polymer, such as, for example, from a polyacrylate, a diene polymer or an ethylene/propylene/diene terpolymer; and block copolymers of styrene, such as, for example, styrene/butadiene/styrene, styrene/isoprene/styrene, styrene/ethylene/butylene/styrene or styrene/ethylene/propylene/styrene. Styrenic polymers may additionally or alternatively include graft copolymers of styrene or α-methylstyrene such as, for example, styrene on polybutadiene, styrene on polybutadiene-styrene or polybutadiene-acrylonitrile; styrene and acrylonitrile (or methacrylonitrile) on polybutadiene; styrene and maleic anhydride or maleimide on polybutadiene; styrene, acrylonitrile and maleic anhydride or maleimide on polybutadiene; styrene, acrylonitrile and methyl methacrylate on polybutadiene, styrene and alkyl acrylates or methacrylates on polybutadiene, styrene and acrylonitrile on ethylene/propylene/diene terpolymers, styrene and acrylonitrile on polyacrylates or polymethacrylates, styrene and acrylonitrile on acrylate/butadiene copolymers, as well as mixtures of with the styrenic copolymers indicated above.

Nitrile polymers are also useful in the polymer composition of the invention. These include homopolymers and copolymers of acrylonitrile and its analogs such as methacrylonitrile, such as polyacrylonitrile, acrylonitrile/butadiene polymers, acrylonitrile/alkyl acrylate polymers, acrylonitrile/alkyl methacrylate/butadiene polymers, acrylonitrile/butadiene/styrene (ABS), and ABS which includes methacrylonitrile.

Polymers based on acrylic acids, such as acrylic acid, methacrylic acid, methyl methacrylate acid and ethacrylic acid and esters thereof may also be used. Such polymers include polymethylmethacrylate, and ABS-type graft copolymers wherein all or part of the acrylonitrile-type monomer has been replaced by an acrylic acid ester or an acrylic acid amide. Polymers including other acrylic-type monomers, such as acrolein, methacrolein, acrylamide and methacrylamide may also be used.

Halogen-containing polymers may also be useful. These include resins such as polychloroprene, epichlorohydrin homopolymers and copolymers, polyvinyl chloride, polyvinyl bromide, polyvinyl fluoride, polyvinylidene chloride, chlorinated polyethylene, chlorinated polypropylene, fluorinated polyvinylidene, brominated polyethylene, chlorinated rubber, vinyl chloride-vinylacetate copolymer, vinyl chloride-ethylene copolymer, vinyl chloride-propylene copolymer, vinyl chloride-styrene copolymer, vinyl chloride-isobutylene copolymer, vinyl chloride-vinylidene chloride copolymer, vinyl chloride-styrene-maleic anhydride tercopolymer, vinyl chloride-stryene-acrylonitrile copolymer, vinyl chloride-isoprene copolymer, vinyl chloride-chlorinated propylene copolymer, vinyl chloride-vinylidene chloride-vinyl acetate tercopolymer, vinyl chloride-acrylic acid ester copolymers, vinyl chloride-maleic acid ester copolymers, vinyl chloride-methacrylic acid ester copolymers, vinyl chloride-acrylonitrile copolymer and internally plasticized polyvinyl chloride.

Other useful thermoplastic polymers include homopolymers and copolymers of cyclic ethers, such as polyalkylene glycols, polyethylene oxide, polypropylene oxide or copolymers thereof with bis-glycidyl ethers; polyacetals, such as polyoxymethylene and those polyoxymethylene with contain ethylene oxide as a comonomer; polyacetals modified with thermoplastic polyurethanes, acrylates or methacrylonitrile containing ABS; polyphenylene oxides and sulfides, and mixtures of polyphenylene oxides with polystyrene or polyamides; polycarbonates and polyester-carbonates; polysulfones, polyethersulfones and polyetherketones; and polyesters which are derived from dicarboxylic acid and diols and/or from hydroxycarboxylic acids or the corresponding lactones, such as polyethylene terephthalate, polybutylene terephthalate, poly-1,4-dimethyliol-cyclohexane terephthalate, poly-[2,2,4-(4-hydroxyphenyl)-propane] terephthalate and polyhydroxybenzoates as well as block copolyetheresters derived from polyethers having hydroxyl end groups.

Polyamides and copolyamides which are derived from diamines and dicarboxylic acids and/or from aminocarboxylic acids or the corresponding lactams, such as polyamide-4, polyamide-6, polyamide-6/6, polyamide-6/10, polyamide-6/9, polyamide-6/12, polyamide4/6, polyamide-11, polyamide-12, aromatic polyamides obtained by condensation of m-xylene, diamine and adipic acid; polyamides prepared from hexamethylene diamine and isophthalic and/or terephthalic acid and optionally an elastomer as modifier, for example, poly-2,4,4-trimethylhexamethylene terephthalamide or poly-m-phenylene isophthalamide may be useful. Further copolymers of the aforementioned polyamides with polyolefins, olefin copolymers, ionomers or chemically bonded or grafted elastomers; or with polyethers, such as for instance, with polyethylene glycol, polypropylene glycol or polytetramethylene glycols, and polyamides or copolyamides modified with EPDM or ABS may be used.

The resulting stabilized polymer compositions of the invention may optionally also contain various conventional additives, such as the following:

(1) Antioxidants (1.1) Alkylated monophenols, for example: 2,6-di-t-butyl-4-methylphenol,
2-t-butyl-4,6-dimethylphenol, 2,6-di-t-butyl-4-ethylphenol,
2,6-di-t-butyl-4-n-butylphenol, 2,6-di-t-butyl-4-butylphenol,
2,6-di-cyclopentyl-4-methylphenol, 2-(α-methylcyclohexyl)-4,6-dimethylphenol,
2,6-di-octadecyl-4-methylphenol, 2,4,6-tricyclohexylphenol, and
2,6-di-t-butyl-4-methoxymethylphenol.

(1.2) Alkylated hydroquinones, for example, 2,6-di-t-butyl-4-methoxyphenol,
2,5-di-t-butyl-hydroquinone, 2,5-di-t-amyl-hydroquinone, and
2,6-diphenyl-4-octadecyloxyphenol.

(1.3) Hydroxylated thiodiphenyl ethers, for example,
2,2'-thio-bis-(6-t-butyl-4-methylphenol), 2,2'-thio-bis-(4-octylphenol),
4,4'-thio-bis-(6-t-butyl-3-methylphenol), and 4,4'-thio-bis-(6-t-butyl-2-methylphenol).

(1.4) Alkylidene-bisphenols, for example,
2,2'-methylene-bis-(6-t-butyl-4-methylphenol),
2,2'-methylene-bis-(6-t-butyl-4-ethylphenol),
2,2'-methylene-bis-[4-methyl-6-(alpha-methylcyclohexyl)phenol],
2,2'-methylene-bis-(4-methyl-6-cyclohexylphenol),
2,2'-methylene-bis-(6-nonyl-4-methylphenol),
2,2'-methylene-bis-[6-(α-methylbenzyl)-4-nonylphenol],
2,2'-methylene-bis-[6-(α,α-dimethylbenzyl)-4-nonylphenol],
2,2'-methylene-bis-(4,6di-t-butylphenol), 2,2'-ethylidene-bis-(4,6-di-t-butylphenol),
4,4'-methylene-bis-(6-t-butyl-2-methylphenol),
1,1-bis-(5-t-butyl-4-hydroxy-2-methylphenyl)butane,
2,6-di-(3-t-butyl-5-methyl-2-hydroxybenzyl)-4-methylphenol,
1,1,3-tris-(5-t-butyl-4-hydroxy-2-methylphenyl)butane,
1,1-bis-(5-t-butyl-4-hydroxy-2-methylphenyl)-3-dodecylmercaptobutane,
ethylenglycol-bis-[3,3-bis-(3'-t-butyl-4'-hydroxy-phenyl)-butyrate],
di-(3-t-butyl-4-hydroxy-5-methylphenyl)-dicyclopentadiene, and
di-[2-(3'-t-butyl-2'-hydroxy-5'-methyl-benzyl)-6-t-butyl-4-methylphenyl]terephthalate.

(1.5) Benzyl compounds, for example,
1,3,5-tris-(3,5-di-t-butyl-4-hydroxybenzyl)-2,4,6-trimethylbenzene,
bis(3,5-di-t-butyl-4-hydroxybenzyl)sulfide,
isooctyl-3,5-di-t-butyl-4-hydroxybenzyl-mercapto-acetate,
bis-(4-t-butyl-3-hydroxy-2,6-dimethylbenzyl)dithiolterephthalate,
1,3,5-tris-(3,5-di-t-butyl-4-hydroxybenzyl)isocyanurate,
1,3,5-tris(4-t-butyl-3-hydroxy-2,6-dimethylbenzyl)isocyanurate,
dioctadecyl-3,5-di-t-butyl-4-hydroxybenzyl-phosphonate,
calcium salt of monoethyl 3,5-di-t-butyl-4-hydroxybenzylphosphonate, and
1,3,5-tris-1,3,5-dicyclohexyl-4-hydroxybenzyl)isocyanurate.

(1.6) Acylaminophenols, for example, 4-hydroxy-lauric acid anilide,
4-hydroxy-stearic acid anilide,
2,4-bis-octylmercapto-6-(3,5-t-butyl-4-hydroxy-anilino)-s-triazine, and
octyl-N-(3,5-di-t-butyl-4-hydroxyphenyl)-carbamate.

(1.7) Esters of β-(3,5-di-t-butyl-4-hydroxyphenyl)-propionic acid with monohydric or polyhydric alcohols, for example, methanol, diethyleneglycol, octadecanol, triethyleneglycol, 1,6-hexanediol, pentaerythritol, neopentylglycol, tris-hydroxyethyl isocyanurate, thiodiethyleneglycol, and dihydroxyethyl oxalic acid diamide.

(1.8) Esters of β-(5-t-butyl-4-hydroxy-3-methylphenyl)-propionic acid with monohydric or polyhydric alcohols, for example, methanol, diethyleneglycol, octadecanol, triethyleneglycol, 1,6-hexanediol, pentaerythritol, neopentylglycol, tris-hydroxyethyl isocyanurate, thiodiethyleneglycol, and di-hydroxyethyl oxalic acid diamide.

(1.9) Esters of β-(5-t-butyl-4-hydroxy-3-methylphenyl) propionic acid with mono- or polyhydric alcohols, e.g. with methanol, diethylene glycol, octadecanol, triethylene glycol, 1,6-hexanediol, pentaerythritol, neopentyl glycol, tris (hydroxyethyl)isocyanurate, thiodiethylene glycol, and N,N'-bis(hydroxyethyl)oxalic acid diamide.

(1.10) Amides of β-(3,5-di-t-butyl-4-hydroxyphenyl)-propionic acid, for example,
N,N'-di-(3,5-di-t-butyl-4-hydroxyphenylpropionyl)-hexamethylendiamine,
N,N'-di-(3,5-di-t-butyl-4-hydroxyphenylpropionyl)-trimethylenediamine, and
N,N'-di-(3,5-di-t-butyl-4-hydroxyphenylpropionyl)-hydrazine.

(2) UV absorbers and light stabilizers.

(2.1) 2-(2'-Hydroxyphenyl)-benzotriazoles, for example, the 5'-methyl-, 3',5'-di-t-butyl-, 5'-t-butyl-, 5'-(1,1,3,3-tetramethylbutyl)-, 5-chloro-3'-, 5'-di-t-butyl-, 5-chloro-3'-t-butyl-5'-methyl-, 3'-sec-butyl-5'-t-butyl-, 4'-octoxy, 3',5' -di-t-amyl-, and 3',5'-bis-(α,α-dimethylbenzyl)-derivatives.

(2.2) 2-Hydroxy-benzophenones, for example, the 4-hydroxy-, 4-methoxy-, 4-octoxy-, 4-decyloxy-, 4-dodecyloxy-, 4-benzyloxy-, 4,2',4'-trihydroxy- and 2'-hydroxy-4,4'-dimethoxy- derivatives.

(2.3) Esters of substituted and unsubstituted benzoic acids, for example, phenyl salicylate, 4-t-butyl-phenylsalicilate, octylphenyl salicylate, dibenzoylresorcinol,
bis-(4-t-butylbenzoyl)-resorcinol, benzoylresorcinol,
2,4-di-t-butyl-phenyl-3,5-di-t-butyl-4-hydroxybenzoate and hexadecyl-3,5-di-t-butyl-4-hydroxybenzoate.

(2.4) Acrylates, for example, α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxy-cinnamic acid methyl ester, and
N-(β-carbomethoxy-β-cyano-vinyl)-2-methyl-indoline.

(2.5) Nickel compounds, for example, nickel complexes of
2,2'-thio-bis-[4-(1,1,3,3-tetramethylbutyl)-phenol], such as the 1:1 or 1:2 complex, optionally with additional ligands such as n-butylamine, triethanolamine or N-cyclohexyl-di-ethanolamine, nickel dibutyldithiocarbamate, nickel salts of 4-hydroxy-3,5-di-t-butylbenzylphosphonic acid monoalkyl esters, such as of the methyl, ethyl or butyl ester, nickel complexes of ketoximes such as of 2-hydroxy-4-methyl-pentyl undecyl ketoxime, and nickel complexes of 1-phenyl-4-lauroyl-5-hydroxy-pyrazol, optionally with additional ligands.

(2.6) Sterically hindered amines, for example
bis-(2,2,6,6-tetramethylpiperidyl)-sebacate,
bis-(1,2,2,6,6-pentamethylpiperidyl)-sebacate, n-butyl-3,5-di-t-butyl-4-hydroxybenzyl malonic acid, bis-(1,2,2,6,6-pentamethylpiperidyl)ester, condensation product of 1-hydroxyethyl-2,2,6,6-tetramethyl-4-hydroxy-piperidine and succinic acid, condensation product of N,N'-(2,2,6,6-tetramethylpiperidyl)-hexamethylendiamine and 4-t-octylamino-2,6-dichloro-1,3,5-s-triazine,
tris-(2,2,6,6-tetramethylpiperidyl)-nitrilotriacetate,
tetrakis-(2,2,6,6-tetramethyl-4-piperidyl)-1,2,3,4-butane-tetracarbonic acid,
1,1'-(1,2-ethanediyl)-bis-(3,3,5,5-tetramethylpiperazinone). Such amines include hydroxylamines derived from hindered amines, such as
di-H, 1-hydroxy-2,2,6,6-tetramethylpiperidin-4-yl)sebacate;
1-hydroxy-2,2,6,6-tetramethyl-4-benzoxypiperidine;
1-hydroxy-2,2,6,6-tetramethyl-4(3,5-di-t-butyl-4-hydroxyhydrocinnamoyloxy)piperidine;
and N-H, 1-hydroxy-2,2,6,6-tetramethylpiperidin-4-yl)-ε-caprolactam.

(2.7) Oxalic acid diamides, for example, 4,4'-di-octyloxy-oxanilide,
2,2'-di-octyloxy-5,5-di-t-butyl-oxanilide, 2,2'-di-dodecyloxy-5,5'-di-t-butyl-oxanilide,
2-ethoxy-2'-ethyl-oxanilide, N,N'-bis(3-dimethylaminopropyl)-oxalamide,
2-ethoxy-5-t-butyl-2'-ethyloxanilide and its mixture with 2-ethoxy-2'-ethyl-5,4'-di-t-butyloxanilide and mixtures of o-methoxy and p-methoxy as well as of o-ethoxy and p-ethoxy disubstituted oxanilides.

(3) Metal deactivators, for example, N,N'-diphenyloxalic acid diamide, N-salicylal-N'-salicyloylhydrazine, N,N'-bis-salicyloylhydrazine, N,N'-bis-(3,5-di-t-butyl-4-hydroxyphenylpropionyl)-hydrazine, salicyloylamino-1,2,4-triazole, bis-benzyliden-oxalic acid dihydrazide.

(4) Phosphites and phosphonites, for example triphenyl phosphite, diphenylalkyl phosphites, phenyidialkyl phosphites, tris(nonyl-phenyl)phosphite, trilauryl phosphite, trioctadecyl phosphite, distearyl pentaerythritol diphosphite, tris(2,4-di-t-butylphenyl)phosphite, diisodecyl pentaeythritol diphosphite, bis(2,4-di-t-butylphenyl)pentaerythritol diphosphite, tristearyl sorbitol triphosphite, and tetrakis(2,4-di-t-butylphenyl) 4,4'-biphenylene diphosphonite.

(5) Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc-dibutyl-dithlocarbamate, dioctadecyldisulfide, pentaerythritol-tetrakis(β-dodecylmercapto)-propionate.

(6) Polyamide stabilizers, for example copper salts in combination with iodides and/or phosphorus compounds and salts of divalent manganese.

(7) Basic co-stabilizers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, barium stearate, magnesium stearate, sodium ricinoleate, potassium palmitate, antimony pyrocatecholate and zinc pyrocatecholate.

(8) Nucleating agents, for example, 4-t-butyl-benzoic acid, adipic acid, diphenylacetic acid.

(9) Fillers and reinforcing agents, for example, calcium carbonate, silicates, glass fibers, asbestos, talc, kaolin, mica, barium sulfate, metal oxides and hydroxides, carbon black, graphite.

(10) Aminoxy propanoate derivatives such as
methyl-3-[N,N-dibenzylaminoxy]propanoate; ethyl-3-[N,N-dibenzylaminoxy]propanoate;
1,6-hexamethylene-bis[3-(N,N-dibenzylaminoxy) propanoate];
methyl-[2-(methyl)-3(N,N-dibenzylaminoxy)propanoate];
octadecyl-3-[N,N-dibenzyl-aminoxy]propanoic acid;
tetrakis[(N,N-dibenzylaminoxy)ethyl carbonyl oxymethyl] methane;
octadecyl-3-[N,N-diethylaminoxy]propanoate; 3-[N,N-dibenzylaminoxy]propanoic acid
potassium salt; and 1,6-hexamethylene bis[3-(N-allyl-N-dodecyl aminoxy)propanoate].

(11) Other additives, for example, plasticizers, lubricants, emulsifiers, pigments, optical brighteners, flame-proofing agents, anti-static agents, blowing agents and thiosynergists such as dilaurylthiodipropionate or distearylthiodipropionate.

Hindered phenolic antioxidants may also be present in the polymer composition. Use of bis-aralkylphenyl pentaerythritol diphosphites of the present invention may result in enhanced polymer protection by reducing the formation of color resulting from the presence of the phenols. Such phenolic antioxidants Include In addition to those specifically mentioned previously,
n-octadecyl-3,5-di-t-butyl-4-hydroxyhydrocinnamate, tetrakis methylene 3,5-di-t-butyl-4-hydroxyhydrocinnamate), tetrakis methylene (3,5-di-t-butyl-4-hydroxyhydrocinnamate),
di-n-octadecyl-3,5-di-t-butyl-4-hydroxybenzyl-phosphonate,
1,3,5-tris(3,5-di-t-butyl-4-hydroxybenzyl-)isocyanurate,
thiodiethylene-bis(3,5-di-t-butyl-4-hydroxyhydrocinnamate),
1,3,5-trimethyl-2,4,6-tris(3,5-di-t-butyl-4-hydroxybenzyl) benzene,
3,6-di-oxaoctamethylene bis(3-methyl-5-t-butyl-4-hydroxyhydrocinnamate),
2,6-di-t-butyl-p-cresol, 2,2'-ethylidene-bis(4,6-di-t-butylphenol),
1,3,5-tris-(2,6-di-methyl-4-t-butyl-3-hydroxybenzyl) isocyanurate, 1,1,3-tris-(2-methyl-4-hydroxy-5-t-butylphenyl)butane,
1,3,5-tris[2-(3,5-di-t-butyl-4-hydroxyhydrocinnamoloxy)-ethyl]-isocyanurate,
3,5-di-(3,5-di-t-butyl-4-hydroxybenzyl)-mesitol,
hexamethylene-bis(3,5-di-t-butyl-4-hydroxyhydrocinnamate),
1-(3,5-di-t-butyl-4-hydroxyanilino)-3,5-di(octylthio)-s-triazine,
N,N'-hexamethylene-bis(3,5-di-t-butyl-4-hydroxyhydrocinnamamide), calcium
bis(ethyl-3,5-di-t-butyl-4-hydroxybenzylphosphonate), ethylene
bis[3,3-di(3-t-butyl-4-hydroxyphenyl)butyrate], octyl
3,5-di-t-butyl-4-hydroxybenzylmercaptoacetate,
bis(3,5-di-t-butyl-4-hydroxyhydrocinnamoyl)hydrazide, and
N,N'-bis-[2-(3,5-t-butyl-4-hydroxyhydroxocinnamoyloxy)-ethyl]-oxamide, and preferably neopentanetetrayltetrakis (3,5-di-t-butyl-4-hydroxyhydrocinnamate),
n-octadecyl-3,5-di-t-butyl-4-hydroxyhydrocinnamate,
1,3,5-trimethyl-2,4,6-tris(3,5-di-t-butyl-4-hydroxy-benzyl) benzene,
1,3,5-tris-(3,5-di-t-butyl-4-hydroxybenzyl)isocyanurate,
2,6-di-t-butyl-p-cresol or
2,2'-ethylidene-bis(4,6-di-t-butylphenol).

Other additives, such as oxazaphospholidines, may additionally or alternatively be present. Likewise, the instant compounds prevent color formation when hindered amine light stabilizers are present, such hindered amines including bis(1,2,2,6,6-pentamethyl,4-piperidyl)-2-n-butyl-2-(3,5-di-t-butyl-4-hydroxy-benzyl)malonate; bis(2,2,6,6-tetramethyl-4-piperidyl)sebacate; dimethylsuccinate polymer with 4-hydroxy-2,2,6,6-tetramethyl-1-piperidinethanol; and polymers of 2,4-dichloro-6-octylamino-s-triazine with N'-(2,2,6,6-tetramethyl-4-piperidyl)hexamethylene diamine.

The invention has been described with reference to preferred and alternate embodiments. Obviously, modifications and alterations will occur to others upon the reading and understanding of the specification. It is intended to include all such modifications and alterations Insofar as they come within the scope of the appended claims or the equivalents thereof.

What is claimed is:

1. A composition which comprises:
   at least one phosphite selected from the group consisting of bis(2,4-dicumylphenyl)pentaerythritol diphosphite and 2-butyl-2-ethyl-1,3-propanediol 2,4,6-tri-t-butylphenol phosphite; and
   a 3-phenyl-3H-benzofuran-2-one lactone of general formula (I) wherein:

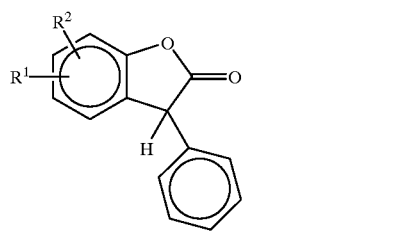

(I)

R1 and R2 are independently selected from hydrogen, alkyl of 1–20 carbon atoms, aryl, aralkyl of 7–30 carbon atoms, and alkyaryl of 7–30 carbon atoms.

2. The composition of claim 1 wherein
   a phosphite/lactone weight ratio is from 100:1 to 0.01:1.

3. The composition of claim 1 further comprising at least one additional phosphite.

4. The composition of claim 1 comprising at least one additional phosphite selected from the group consisting of tris-(2,4-di-t-butylphenyl)phosphite, distearyl pentaerythritol diphosphite, trisnonylphenyl phosphite, phenyl diisodecyl phosphite, diphenyl isodecyl phosphite, triphenyl phosphite, trilauryl phosphite, alkyl ($C_{12}$–$C_{15}$) bisphenol A phosphite, alkyl ($C_{10}$) bisphenol A phosphite, bis-(2,4-di-t-butylphenyl)pentaerythritol diphosphite, bis-(2,6-di-t-butyl-4-methylphenyl)pentaerythritol diphosphite, tetrakis-(2,4-di-t-butylphenyl) 4,4'-diphenylenediphosphonite, 2,2'-ethylidene bis-(4,6-di-t-butylphenyl)fluorophosphonite, bis-(2,4-di-t-butyl-6-methylphenyl)ethyl phosphite, and 2,2',2"-nitrilotriethanol tris[3,3',5,5'-tetra-tert-butyl-1,1'-biphenyl-2,2'-diyl)-phosphite.

5. The composition of claim 1, further comprising a hindered phenol antioxidant.

6. The composition of claim 1, further comprising a hindered phenol antioxidant selected from the group consisting of 2,6-di-t-butyl-4-methylphenol, tetrakis methylene [(3,5-di-t-butyl-4-hydroxhydrocinnamate)]methane, octadecyl 3,5-di-t-butyl-4-hydroxyhydrocinnamate, tris(3,5-di-t-butyl-4-hydroxybenzyl)-1,3,5-triazine-2,4,6(1H, 3H, 5H)-trione, and α-tocopherol.

7. The composition of claim 1 wherein
   said at least one phosphite is bis-(2,4-dicumylphenyl) pentaerythritol disphosphite.

8. The composition of claim 1 wherein
   the lactone is selected from the group consisting of 5,7-di-t-butyl-3-phenyl-3H-benzofuran-2-one, 5,7-di-cumyl-3-phenyl-3H-benzofuran-2-one, nonyl-3-phenyl-3H-benzofuran-2-one, dinonyl-3-phenyl-3H-benzofuran-2-one; 5-t-butyl-3-phenyl-3H-benzofuran-2-one, 5-cumyl-3-phenyl-3H-benzofuran-2-one, and octyl-3-phenyl-3H-benzofuran-2-one.

9. The composition of claim 5 wherein
   a phosphite/hindered phenol antioxidant/lactone weight ratio is from 100:100:1 to 0.01:0.01:1.

10. The composition of claim 1 further comprising:
    a polymer selected from the group consisting of polyolefins, polyesters, polyurethanes, polyalkylene terephthalates, polysulfones, polyimides, polyphenylene ethers, styrenic polymers, polycarbonates, acrylic polymers, polyamides, polyacetals, halide containing polymers and mixtures thereof.

11. A process for improving the oxidative stability of a polymer composition comprising a polymer, said process comprising;
    adding at least one phosphite selected from the group consisting of bis(2,4-dicumylphenyl)pentaerythritol diphosphite and 2-butyl-2-ethyl-1,3-propanediol 2,4,6-tri-t-butylphenol phosphite; and
    adding a synergistic amount of azz
    a 3-phenyl-3-H-benzofuran-2-one lactone of general formula (I) wherein:

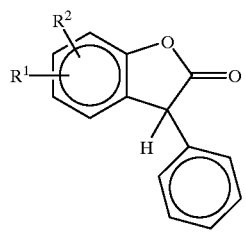 (I)

wherein:
R¹ and R² are independently selected from hydrogen, alkyl of 1–20 carbon atoms, aryl, aralkyl of 7–30 carbon atoms, and alkylaryl of 7–30 carbon atoms.

12. The process composition of claim 11 wherein a phosphite/lactone weight ratio is from 100:1 to 0.01:1.

13. The process of claim 11 further comprising adding at least one additional phosphite.

14. The process of claim 11 further comprising adding at least one additional phosphite selected from the group consisting of tris-(2,4-di-t-butylphenyl)phosphite, distearyl pentaerythritol diphosphite, trisnonylphenyl phosphite, phenyl diisodecyl phosphite, diphenyl isodecyl phosphite, triphenyl phosphite, trilauryl phosphite, alkyl ($C_{12}$–$C_{15}$) bisphenol A phosphite, alkyl ($C_{10}$) bisphenol A phosphite, bis-(2,4-di-t-butylphenyl)pentaerythritol diphosphite, bis-(2,6-di-t-butyl-4-methylphenyl)pentaerythritol diphosphite, tetrakis-(2,4-di-t-butylphenyl) 4,4'-diphenylenediphosphonite, 2,2'-ethylidene bis-(4,6-di-t-butylphenyl)fluorophosphonite, bis-(2,4-di-t-butyl-6-methylphenyl)ethyl phosphite, and 2,2',2"-nitrilotriethanol tris[3,3',5,5'-tetra-tert-butyl-1,1'-biphenyl-2,2'-diyl)-phosphite.

15. The process of claim 11 further comprising adding a hindered phenol antioxidant.

16. The process of claim 11 further comprising adding a hindered phenol antioxidant selected from the group consisting of 2,6-di-t-butyl-4-methylphenol, tetrakis methylene [(3,5-di-t-butyl-4-hydroxhydrocinnamate)]methane, octadecyl 3,5-di-t-butyl-4-hydroxyhydrocinnamate, tris(3,5-di-t-butyl-4-hydroxybenzyl)-1,3,5-triazine-2,4,6(1H, 3H, 5H)-trione, and α-tocopherol.

17. The process of claim 11 wherein said at least one phosphite is bis-(2,4-dicumylphenyl) pentaerythritol disphosphite.

18. The process of claim 11 wherein the lactone is selected from the group consisting of 5,7-di-t-butyl-3-phenyl-3H-benzofuran-2-one, 5,7-dicumyl-3-phenyl-3H-benzofuran-2-one, nonyl-3-phenyl-3H-benzofuran-2-one, dinonyl-3-phenyl-3H-benzofuran-2-one; 5-t-butyl-3-phenyl-3H-benzofuran-2-one, 5-cumyl-3-phenyl-3H-benzofuran-2-one, and octyl-3-phenyl-3H-benzofuran-2-one.

19. The process of claim 15 wherein a phosphite/antioxidant/lactone weight ratio is from 100:100:1 to 0.01:0.01:1.

20. The process of claim 11, said polymer selected from the group consisting of polyolefins, polyesters, polyurethanes, polyalkylene terephthalates, polysulfones, polyimides, polyphenylene ethers, styrenic polymers, polycarbonates, acrylic polymers, polyamides, polyacetals, halide containing polymers and mixtures thereof.

21. A composition which comprises:
bis(2,4-dicumylphenyl)pentaerythritol diphosphite; and
at least one lactone selected from the group consisting of 5,7-di-t-butyl-3-phenyl-3H-benzofuran-2-one, 5,7-dicumyl-3-phenyl-3H-benzofuran-2-one, nonyl-3-phenyl-3H-benzofuran-2-one, dinonyl-3-phenyl-3H-benzofuran-2-one; 5-t-butyl-3-phenyl-3H-benzofuran-2-one, 5-cumyl-3-phenyl-3H-benzofuran-2-one, and octyl-3-phenyl-3H-benzofuran-2-one, and 2-butyl-2-ethyl-1,3-propanediol 2,4,6-tri-t-butylphenol phosphite.

22. The composition of claim 21, further comprising at least one additional phosphite selected from the group consisting of tris-(2,4-di-t-butylphenyl)phosphite, distearyl pentaerythritol diphosphite, trisnonylphenyl phosphite, phenyl diisodecyl phosphite, diphenyl isodecyl phosphite, triphenyl phosphite, trilauryl phosphite, alkyl ($C_{12}$–$C_{15}$) bisphenol A phosphite, alkyl ($C_{10}$) bisphenol A phosphite, bis-(2,4-di-t-butylphenyl)pentaerythritol diphosphite, and 2,2',2"-nitrilotriethanol tris[3,3',5,5'-tetra-tert-butyl-1,1'-biphenyl-2,2'-diyl)-phosphite.

\* \* \* \* \*

UNITED STATES PATENT AND TRADEMARK OFFICE
CERTIFICATE OF CORRECTION

PATENT NO. : 6,224,791 B1
DATED : May 1, 2001
INVENTOR(S) : Stein et al.

It is certified that error appears in the above-identified patent and that said Letters Patent is hereby corrected as shown below:

Title page,
Line 1, replace "phosphates" with -- phosphites --.

Signed and Sealed this

Eighteenth Day of September, 2001

*Attest:*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO.     : 6,224,791 B1
DATED          : May 1, 2001
INVENTOR(S)    : Stein et al.

It is certified that error appears in the above-identified patent and that said Letters Patent is hereby corrected as shown below:

Column 18,
Line 30, replace "2-butyl-2-ethyl-1, 3-propanediol 2, 4, 6-tri-t-butylphenol phosphite" with -- delete --.
Line 42, replace after "2,2'-diyl) - phosphite", insert -- 2-butyl-2-ethyl-1, 3-propanediol 2, 4, 6-tri-t-butylphenol phosphite --

Signed and Sealed this

Twelfth Day of August, 2003

JAMES E. ROGAN
*Director of the United States Patent and Trademark Office*